E. J. SPÄHR.
HUB ATTACHING DEVICE.
APPLICATION FILED SEPT. 2, 1909.
979,105.
Patented Dec. 20, 1910.
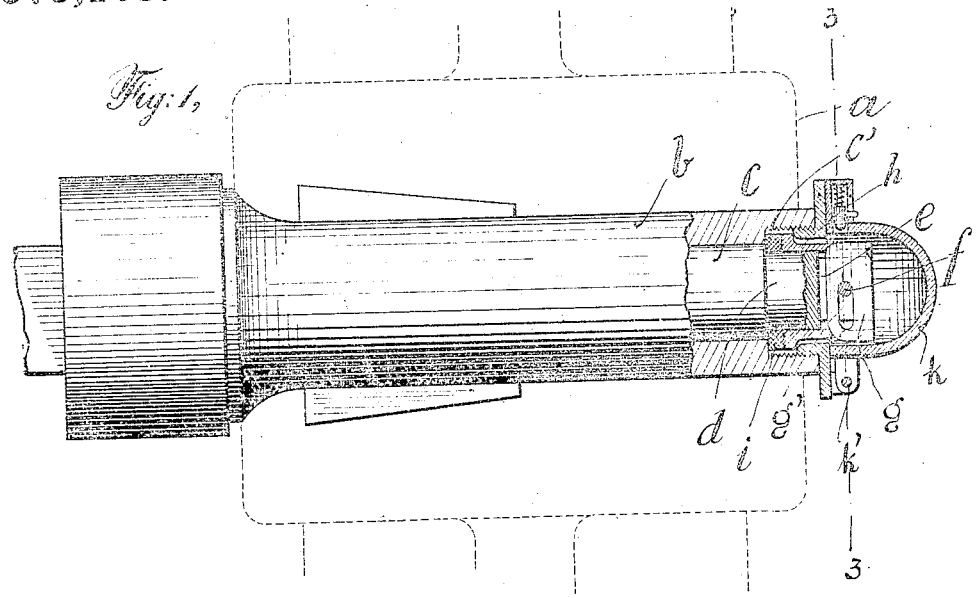
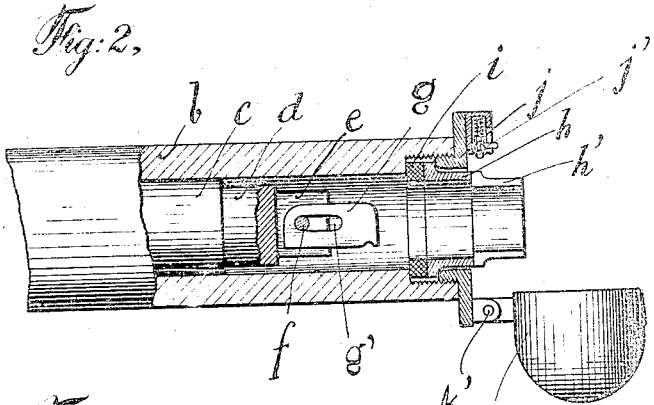
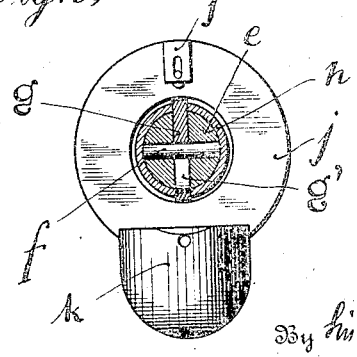
Witnesses:
M. Gartner
H. K. Weinberg
Inventor
Ernst Julius Spähr
By his Attorney

UNITED STATES PATENT OFFICE.

ERNST JULIUS SPÄHR, OF NEW YORK, N. Y., ASSIGNOR OF ONE-HALF TO OTTO SEMLER AND EMIL BOHRMANN, OF NEW YORK, N. Y.

HUB-ATTACHING DEVICE.

979,105.  Specification of Letters Patent.  Patented Dec. 20, 1910.

Original application filed November 2, 1908, Serial No. 460,730. Divided and this application filed September 2, 1909. Serial No. 515,871.

*To all whom it may concern:*

Be it known that I, ERNST JULIUS SPÄHR, residing at New York, in the county of New York and State of New York, have invented certain new and useful Improvements in Hub-Attaching Devices, of which the following is a specification.

The present invention is a division of my application, Ser. No. 460,730, filed November 2, 1908, and relates to axle boxes and particularly to means for attaching said axle boxes to the journal of vehicle axles or spindles.

The object of my invention is to provide a construction that will allow of the axle box being securedly attached to the journal of an axle or spindle and being capable of being readily removed therefrom.

In order to make my invention more clear the same is illustrated in the accompanying drawing in which similar reference letters denote corresponding parts and in which—

Figure 1 is a longitudinal section of the outer end of the axle box as attached to the journal of an axle or spindle; Fig. 2 a longitudinal section of the outer end of the axle box and of the journal and Fig. 3 is a cross section on line 3—3 of Fig. 1.

In the drawing $a$ denotes the hub of the wheel, $b$ the axle box and $c$ the journal of the vehicle or spindle. The reduced portion $d$ of the journal $c$ is split forming a central longitudinal slot $e$ and carries a cross pin $f$ extending through said slot. A plate $g$ adapted to act as a key or lock and provided with a recess $g'$ is engaged by the cross pin $f$ and is capable of swinging thereon and of being longitudinally displaced within the recess or slot $e$. In the widened and threaded open end of the axle box a washer $i$ is placed which is adapted to fit around the reduced portion $d$ of the journal $c$, and a bushing $h$ is screwed into it against the said washer. The forward end $h'$ of the bushing is provided with longitudinal recesses which are adapted when registering with the slot $e$ in the journal to engage the plate $g$ upon swinging the latter crosswise to the axis of the journal into the position shown in Fig. 1. By the engagement of the plate $g$ in the said recesses of the part $h'$ of the bushing the axle box will be locked in position upon the spindle.

Screwed or otherwise removably secured in the open end of the axle box by means of a disk-shaped portion $j$ is a cup-shaped lid $k$ hinged at $k'$ thereto and adapted to close around the lock $g$ protecting it from mud or dust. The lid may be made to lock by means of a spring lock $j'$ or the like.

What I claim and desire to secure by Letters Patent is:

The combination with an axle box, of an axle, the journal of which is split or slotted at its outer end, a recessed plate or key pivotally and slidably secured in said slotted journal, a recessed bushing in said axle box adapted to loosely fit over the split end of the journal and to engage the plate when turned crosswise to the axis of the journal, an outer bushing screwing into the outer end of the axle box and a lid hinged to said outer bushing and adapted to close around the free end of the journal and to be locked in closed position.

In testimony whereof I affix my signature in presence of two witnesses.

ERNST JULIUS SPÄHR.

Witnesses:
 ARTHUR D. STRAHL,
 MAX D. ORDMANN.